United States Patent [19]  
Schlafer

[11] 4,117,177  
[45] Sep. 26, 1978

[54] LASER LITHOGRAPHY OF THIN FILM RESINATES

[75] Inventor: John D. Schlafer, Wayland, Mass.

[73] Assignee: GTE Laboratories Incorporated, Waltham, Mass.

[21] Appl. No.: 723,003

[22] Filed: Sep. 13, 1976

[51] Int. Cl.$^2$ .......................... B05D 3/06; B05D 5/06
[52] U.S. Cl. ........................................ 427/53; 427/68; 427/264; 427/272; 427/376 A; 96/36.1; 96/45.1
[58] Field of Search ................... 427/53, 68, 165, 264, 427/272, 376 B, 376 E, 376 G, 376 R, 43, 55, 56, 271; 96/36.1, 45.1, 44, 45

[56] References Cited

U.S. PATENT DOCUMENTS

| 3,569,761 | 3/1971 | Lange | 313/92 |
| 3,681,111 | 8/1972 | Kaplan | 427/68 |
| 3,884,694 | 5/1975 | Gallaro | 427/53 |
| 3,884,695 | 5/1975 | Gallaro | 427/53 |
| 3,932,183 | 1/1976 | Fisher | 427/53 |
| 4,000,334 | 12/1976 | Hallman et al. | 427/53 |
| 4,027,312 | 5/1977 | Schlafer et al. | 96/36.1 |
| 4,054,094 | 10/1977 | Caddell et al. | 101/467 |
| 4,059,707 | 11/1977 | Smith et al. | 427/53 |

FOREIGN PATENT DOCUMENTS

| 44,930 | 4/1976 | Japan | 427/53 |
| 519,988 | 4/1972 | Switzerland | 427/53 |
| 1,257,933 | 12/1971 | United Kingdom | 96/36.1 |

OTHER PUBLICATIONS

Fugardi "Thick-Film Printing With a Laser" IBM Tech. Disc. Bull., vol. 14, No. 10, Mar. 1972, p. 2855.
IBM Technical Disclosure Bulletin, vol. 14, No. 8, Jan. 1972, p. 2358.

Primary Examiner—John T. Goolkasian  
Attorney, Agent, or Firm—David M. Keay

[57] ABSTRACT

The mosaic image screen of a shadow mask color tube has a plurality of sets of elemental screen areas, each of which areas includes a phosphor for emitting light of one of three primary colors and a filter which is transmissive of that color but otherwise is essentially a visible light attenuator. The color filter for the first set is formed by applying a thin film of a metallic resinate of a particular color onto the faceplate, directing a laser beam to the elemental screen areas for the other two primary colors to liquify the film and to withdraw the liquefied film from these areas, and heating the entire film to raise the energy threshold at which liquefaction occurs. Second and third metallic resinate films of the other two colors are similarly processed, and then all three films are heated to volatilize their respective organic material to form the color filters.

7 Claims, 7 Drawing Figures

LASER LITHOGRAPHY OF THIN FILM RESINATES

BACKGROUND OF THE INVENTION

The present invention relates to a method of manufacturing a shadow mask type of cathode ray tube for color television and, more specifically, to a tube having colored optical filter elements on the inner surface of the tube faceplate.

In the manufacture of certain types of shadow mask cathode ray tubes for color television, it is desirous to incorporate a colored optical filter element between each phosphor segment or dot and the tube faceplate. These color filters are designed to transmit the desired portion of the wavelength spectrum emitted by the respective phosphor dot, e.g., red, green or blue, and absorb all other visible light, including that impinging from the ambient illumination. One method for obtaining these filter elements is to use organo-metallic resinate materials, such as are available from Englehard Industries as lusters, applied in thin films and patterned in the appropriate manner to give the correct filter elements under each phosphor. These resinate films when fired at or above 430° C are converted to a thin hard layer showing good adherence and intense colors on transmission.

In a conventional method for providing these filters, the hole patterns which must be present in each filter layer on the tube faceplate may be introduced using traditional photolithographic techniques. A layer of photoresist, such as polyvinyl alcohol (PVA) is applied to the inner surface of the faceplate, exposed through the shadow mask and developed to leave resist at the hole sites. The resinate film is laid over this and fired at approximately 430° C to form the filter. Due to poor adhesion in the areas formerly occupied by the photoresist which is now decomposed, the film may be removed by abrasive action, leaving holes in the remaining film. Each layer is treated in the same manner.

While this method has been generally satisfactory, it has several disadvantages. First, the method has many steps including resist application, exposure, and development for each film. Also, for three layers, three high temperature firings are required. Further, the removal of fired film from the hole areas requires an operation which may damage the remaining film and leave random holes incompletely cleared.

SUMMARY OF THE INVENTION

It is an object of the present invention to provide an improved method of forming the color filter on the faceplate of a shadow mask cathode ray tube.

It is another object of the invention to provide a reduced number of processing steps as required in photoresist techniques and further to eliminate the problem of photoresist residue which may contaminate later phosphor applications.

Still another object is to form all three color filters with metallic resinate thin films but with only one high temperature firing process.

According to one aspect of the invention there is provided an improvement in a method of manufacturing a color cathode ray tube in which an image screen is deposited on a glass faceplate. The image screen is of the type consisting of a plurality of sets of elemental screen areas which areas individually include a phosphor material for emitting light of one of three primary colors and a light filter, disposed between the phosphor material and the glass faceplate, which is predominantly transmissive to light emitted by its associated phosphor material but substantially nontransmissive to the remaining two colors. The image screen also has areas adjacent to the elemental screen areas which include up to all three light filters. An improved method for forming the color filter comprises applying a thin film of a metallic resinate to the faceplate, the resinate having an inorganic oxide colorant of a preselected one of the three primary colors in a vehicle of organic character which volatilizes upon firing to a predetermined temperature. The method also includes heating the thin film applied to the elemental screen areas corresponding to the other two primary colors to a temperature and for a time interval effective to create substantially complete dispersion of the thin film so that the elemental screen areas for the other two primary colors are substantially free of the thin film. Preferably, this step of heating includes directing a laser beam of light into the elemental screen areas for the other two primary colors, and the absorption of laser light by the resinate thin film or by the glass faceplate adjacent to the film creates localized heating and liquefaction of the film. The fluid in these areas is acted upon by forces of surface tension and rapidly volatilizing residual solvents in the film to cause withdrawal of the thin film from these areas. Lastly, the thin film having holes formed therein, is heated as a whole to volatilize the organic material to form the color filter on the elemental screen areas for the preselected primary color and the adjacent areas, the color filter for the preselected primary color being absent from the elemental screen areas corresponding to the other two primary colors.

DESCRIPTION OF PREFERRED EMBODIMENTS

Figure 1:
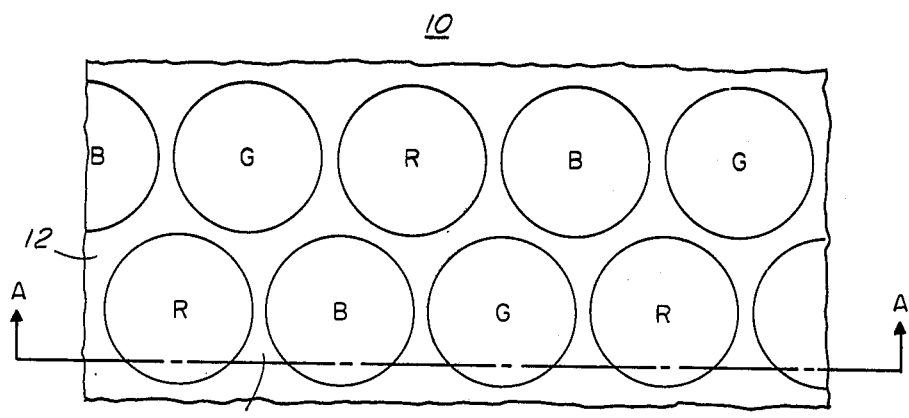
FIG. 1 is a plan view of a portion of an image screen for a shadow mask color tube showing triads of elemental screen areas.

The present invention relates to a method of manufacturing a color cathode ray tube in which an image screen is deposited on a glass faceplate. As shown in FIG. 1, an image screen 10 consists of a plurality of sets of elemental screen areas which individually include a phosphor material for emitting light of one of the three primary colors and a light filter disposed between the phosphor material and the glass faceplate. The filter is predominantly transmissive to light emitted by its associated phosphor material but substantially non-transmissive to the remaining two colors. The three primary colors green, blue and red are identified by the reference letters G, B and R, respectively. The image screen 10 also includes areas 12 adjacent to the elemental screen areas which may include all three light filters. While in the exemplary embodiment, the elemental screen areas are shown as being circular and non-tangential with respect to each other, it is to be understood that the invention is equally applicable to other arrangements. For example, the elemental screen areas may also be interlaced or tangential. Also, it is not necessary that the elemental screen areas be circular in shape; for example, they may be in the shape of elongated slots as is well known in the art.

Figure 2:
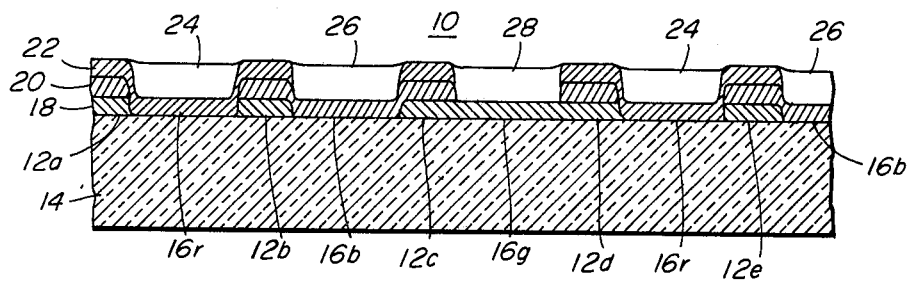
FIG. 2 is a diagram illustrating the method of fabricating the image screen of a shadow mask color tube according to the invention.

FIG. 2 is a sectional view of the image screen 10 taken along line A—A of FIG. 1. The screen 10 is deposited upon a glass faceplate 14, and includes elemental screen areas 16b, 16r and 16g for the primary colors blue, red and green, respectively, and areas 12a, 12b, 12c, 12d and 12e which are between the various elemental screen areas. In the method of producing the image screen 10, a layer 18 of a green color filter is deposited upon the faceplate 14 on elemental screen area 16g and each adjacent area 12a through 12e. Then, a layer 20 of a blue color filter is deposited upon the faceplate 14 at elemental screen area 16b and upon the green filter layer 18 at the adjacent areas 12a through 12e. Next, a layer 22 of a red color filter is deposited upon the faceplate 14 at elemental screen areas 16r and upon the blue color filter layer 20 at adjacent areas 12a through 12e. Finally, through the utilization of photolithographic techniques, layers 24, 26 and 28 of red, blue and green phosphors, respectively, are deposited upon the color filter in elemental screen areas 16r, 16b and 16g, respectively. As a result, each elemental screen area includes a phosphor of one of the three primary colors and a color filter for that particular primary color and each adjacent area includes a color filter for each of the three primary colors. Thus, the elemental screen areas generate light through the faceplate of one color in response to the phosphor being intercepted by an electron beam, and the adjacent areas generate substantially no light through the faceplate. These phosphor layers may also be deposited upon the upper filter in the adjacent areas 12a through 12e.

The color filter layers are formed from organo-metallic resinate compounds such as those available commercially from the Liquid Gold Division of Englehard Industries of East Newark, New Jersey, and known by the trade name "Lustre". To produce a filter layer which is transparent to a certain band of wavelengths, e.g., green, blue, or red, the appropriate metallic resinate compound is applied to the faceplate in a thin, e.g., 25μm, film and the carrier solvent partially evaporated until the film is dried sufficiently that it will no longer run on a vertical surface. The film is then patterned, as described below, and heated to a predetermined firing temperature for a time such that the organic ingredients are volatilized and driven off, leaving a hard, stable, inorganic film transparent to the desired color and strongly bonded to the faceplate or prior deposited films. Hereinafter the term "resinate" will designate the organo-metallic resinate compound as it exists before the firing procedure which drives off all organic components, and the term "filter" will designate the residue of the organo-metallic resinate compound after firing off organic components, which is transparent to a certain band of wavelengths.

Figure 3:
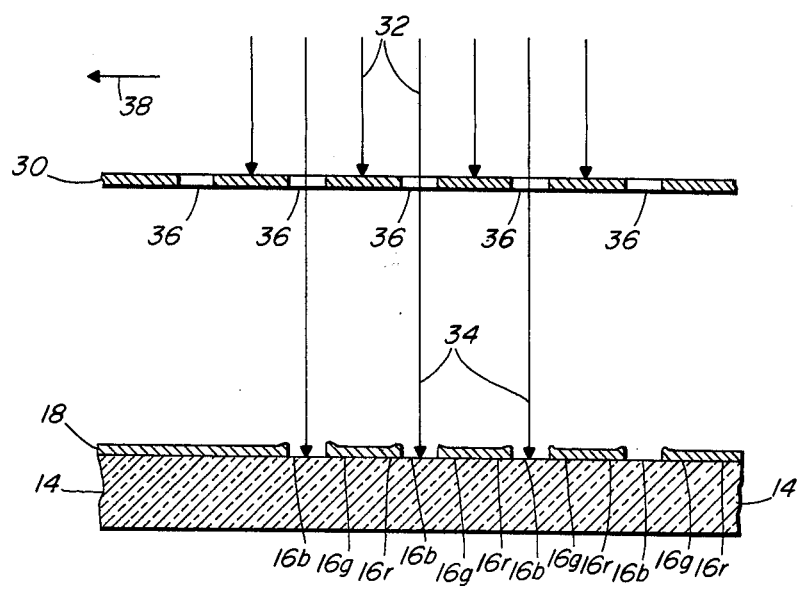
FIG. 3 is a diagram of a preferred embodiment according to the invention.

The following describes the method by which the image screen 10 of FIG. 2 is formed. First, the green filter layer 18 is formed by depositing a thin film of a green-forming resinate over the surface of the entire faceplate 14. The next step in the method relates to the manner by which the layer 18 is removed from the elemental screen areas 16b and 16r. In this step the heat generated by the absorption of a high power laser beam in the resinate film 18 or the substrate 14 causes localized liquefaction of the film 18 in elemental screen areas 16r and 16b. After liquefaction, the fluid in these areas, acted upon by the forces of surface tension and rapid volatilizing residual solvents in the film 18, withdraws from the heated areas. This leaves an open hole in the film with the removed material distributed in a ridge around the edge. An exposure arrangement which will accomplish this is shown in FIG. 3. Shadow mask 30, spaced an appropriate distance from the faceplate 14, blocks the laser radiation 32, in all areas except where holes in the film are desired. Radiation 34 passing through the mask apertures 36 is absorbed by the film 18 or faceplate and produces localized heating in the areas defined by the apertures 36. When the absorbed energy raises the temperature above that required to liquefy the resinate film that area becomes fluid and the film material recedes to the cooler edges where it resolidifies, leaving a hole in the film the same shape as that of the mask aperture. The energy input to the exposed region must be rapid enough such that the residual solvent in the film is quickly volatilized and the exposure is completed before the effects of heat conduction away from the region can cause distortion of the hole shape. This may be accomplished by using short high energy laser pulses or by scanning the laser beam across the shadow mask as illustrated by the directional arrow 38. The holes shown in FIG. 3 being formed in green-forming resinate layer 18 are located in elemental screen area 16b. This step is repeated with respect to elemental screen areas 16r so that only elemental screen area 16g and adjacent areas 12, not shown in FIG. 3, remain having layer 18 therein. This is done by merely altering the angle at which laser radiation 34 passes through aperture 36 in shadow mask 30. At this point, the film 18 is heated to the firing temperature, such as about 430° C for about 1 hour, to volatilize the organic material to form the green color filter. After the green filter is formed as described above, the blue filter layer 20 is formed by depositing a thin film of a blue forming resinate over the surface of the green filter and the faceplate 14 in the elemental screen areas 16b and 16r. The laser beam is directed through the apertures 36 in shadow mask 30 such as to remove the blue-forming resinate from the faceplate 14 at elemental screen areas 16r and from the green filter at elemental screen areas 16g. This is a two step procedure with areas 16r being processed first and then areas 16g being processed. The blue-forming resinate film 20 is then heated to the firing temperature of 430° C for about 1 hour to produce the blue filter. Next, the red filter layer 22 is formed by depositing a thin film of a red-forming resinate over the surface of the blue filter layer 20, the green filter at elemental screen areas 16g and the faceplate at elemental screen area 16r. The laser beam is then directed through the apertures 36 at an angle effective to remove the red-forming resinate first from the area 16g and then from the area 16b. The red-forming resinate layer 22 is heated to the firing temperature of 430° C for about 1 hour.

The above described method requires three high temperature firings before the formation of the three color filter layers is complete. Preferably, however, the following steps are included with the ultimate result being that all three color filters are fired at the same time. After the step of directing the laser beam onto film 18 to produce the holes in elemental screen areas 16r and 16b, the film 18 is heated in an amount which is effective to raise the energy threshold at which liquefaction occurs but ineffective to volatilize the organic material. This may be done by heating film 18 to 200° C for about ½ hour. Following this, layer 20 which is the blue-forming resinate, is applied over the surface of the green-forming resinate 18 and over the faceplate 14 in the elemental screen areas 16b and 16r. This is followed by directing the laser beam through the apertures 36 in shadow mask 30 such as to remove the blue-forming resinate from the faceplate 14 at elemental screen area 16r and from the green-forming resinate at elemental screen areas 16g. The fact that the liquefaction energy threshold of the green-forming resinate has been raised inhibits the green-forming resinate from liquefying at area 16g during removal of the blue-forming resinate. The blue-forming resinate is then subjected to low temperature heating to raise its liquefaction energy threshold. Then, the layer 22 of red-forming resinate is applied over the layer 20, the faceplate at area 16r and the green-forming resinate at area 16g. The laser beam 34 is then directed through apertures 36 at an angle effective to first remove the red-forming resinate from the blue-forming resinate 20 at elemental screen area 16b and then to remove the red-forming resinate 22 from the green-forming resinate 18 at elemental screen area 16g. Finally, all three layers are fired to convert the layers into their respective color filters. The phosphor layers 24, 26 and 28 are then deposited using conventional photolithographic techniques not forming a part of the present invention.

The step of directing a laser beam of light onto the elemental screen areas includes the steps of scanning the laser beam in a fashion effective to intercept the entire surface of the thin film layer and conditioning the scanning laser beam so that the beam intercepts only the elemental screen areas for the other two primary colors of the set. In the embodiment of FIG. 3, this conditioning of the laser beam is carried out by placing the shadow mask 30 between the thin film layer and the effective source of the scanning laser beam and then positioning the effective source of the beam at a location such that the transmitted portions of the beam 34 intercept the thin film only at the elemental screen areas for the other two primary colors. In this type of beam conditioning, the laser beam 32 has a cross-sectional area substantially larger than the area of the aperture 36 in shadow mask 30 so that a plurality of elemental screen areas may be intercepting the scanning laser beam simultaneously.

Figure 4:
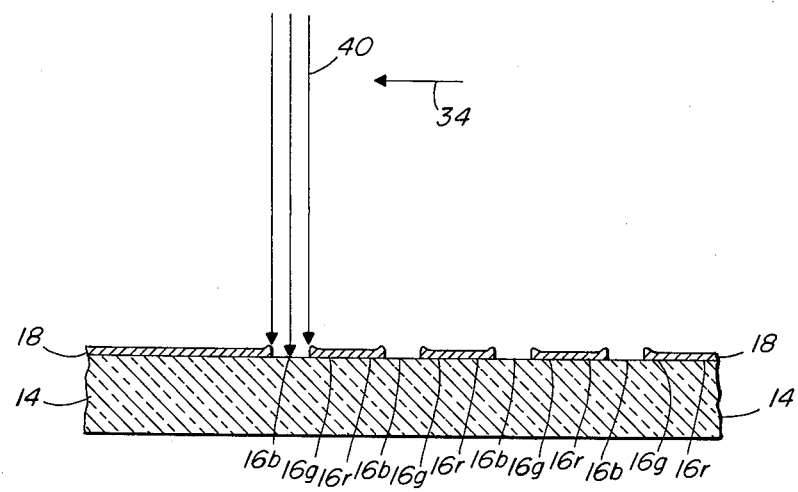
FIG. 4 is a diagram of an alternative embodiment of the invention.

FIG. 4 illustrates how the conditioning of the laser beam may be carried out without the use of a shadow mask. The size and shape of a laser beam 40 at its interception with the film is made to be equal to the size and area of the elemental screen areas. Also, the laser beam 40 is modulated such that the beam is "on" when intercepting the elemental screen areas 16b and 16r and "off" when intercepting the adjacent areas 12 of FIGS. 1 and 2 and the elemental screen areas 16g. Thus, the beam 40 is an appropriately pulsed laser beam when being scanned in the direction of arrow 38. The scan system could also stop the beam at a position for intercepting the appropriate elemental screen area and wait for a laser pulse. The embodiment shown in FIG. 4 requires less energy than the embodiment of FIG. 3 in which the shadow mask is overilluminated because no energy is lost through interception by opaque areas of the mask but requires more precise positioning of the beam and control of its shape.

Figure 5:
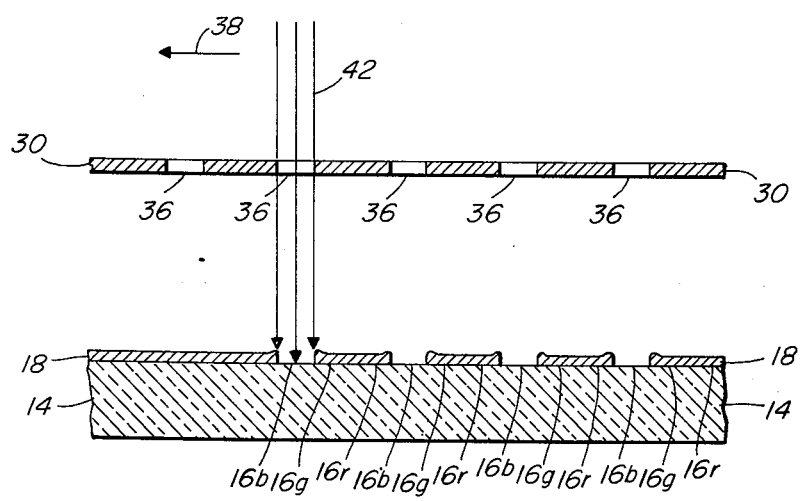
FIG. 5 is a diagram of another alternative embodiment of the invention.

FIG. 5 illustrates a variation of the embodiment of FIG. 4 in which the shadow mask is retained but a laser beam 42 is focused such that most of the energy passes through the aperture 36 of shadow mask 30. This feature reduces the power requirements on the laser while using the mask to define the hole shape.

Figure 6:
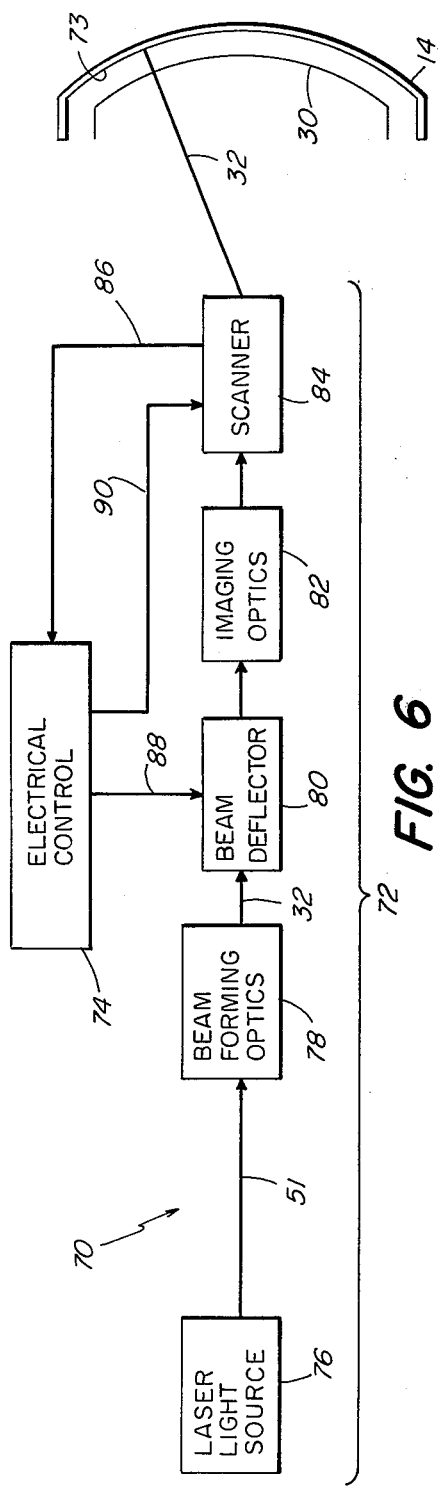
FIG. 6 is a block diagram of a laser scanning system for carrying out the method according to the invention.
Figure 7:
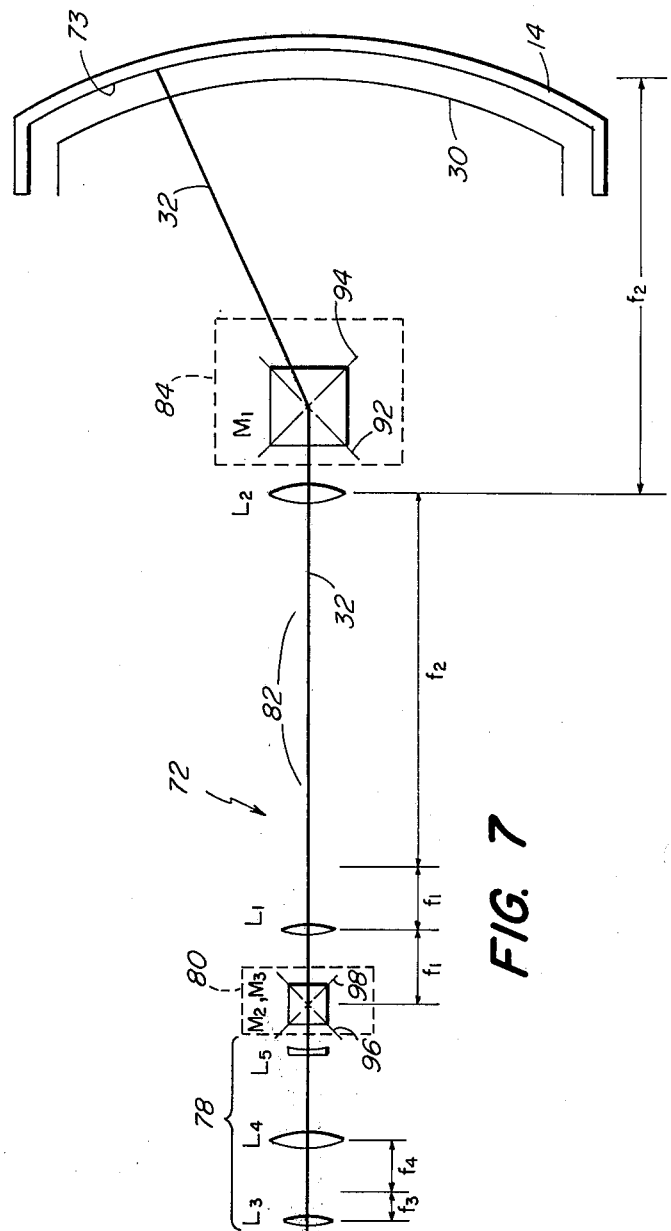
FIG. 7 is a more detailed diagram of the laser scanning system.

One suitable laser scanning system which may be utilized in carrying out the various laser scanning aspects of the present invention is illustrated in block diagram form in FIG. 6 and in more detail in FIG. 7. Referring now to FIG. 6, a laser scanning system 70 includes an optical scanning apparatus, represented generally by the reference numeral 72, and an electrical control system 74. The apparatus 72 includes the necessary mechanical and optical components which perform the actual scanning of a laser beam 32 on the layers of film (not shown) which are deposited upon inner surface 73 of faceplate 14 while the electrical control system 74 generates the command signals for the apparatus 72. The optical scanning apparatus 72 includes a laser light source 76, beam forming optics 78, a beam deflector 80, an imaging optics assembly 82, and a scanner 84. The type of laser which may be used is in general not restricted and is governed mainly by the film and faceplate spectral absorption characteristics, diffraction effects caused by the mask apertures, and energy requirements. Both the $CO_2$ laser at 10.6μm wavelength and the Nd:YAG laser at 1.06μm may be used, although the Nd:YAG is preferred for mask substrate spacings greater than ½ inch because of lesser diffraction effects. The beam forming optics 78 modifies light 51 from the source 76 to obtain the proper beam diameter at the scanner 84. The beam deflector 80 is positioned in the path of light beam and deflects the light beam through an angle which is related to a predetermined angle of incidence that an electron beam has at each point on the shadow mask as it passes through the apertures (not shown) of the mask in an operating tube. The imaging optics 82 receives the deflected light beam and images the point of deflection of the light beam substantially onto the faceplate 14. In this manner, the laser light beam 32 may be made to impinge on the mask with the same angle of incidence as the electron beam from one of the three guns in an operating tube. By this arrangement, the proper angle of incidence is obtained substantially without translation of the light beam at the faceplate. The deflected light beam is scanned over the aperture mask in a predetermined fashion to heat the resinate material adjacent to all light-transmitting regions on the mask. The scanner 84 and the beam deflector 80 operate in synchronism via the electrical control 74 so that the light beam has the proper angle of incidence for each light-transmitting region on the mask. Before initiation of a scanning sequence, the electrical control 74 is provided with, and stores, predetermined information on the deflection which must be applied to the beam 32 to obtain the proper angle of incidence for each position on the aperture mask. Beam position information 86 fed from the scanner 84 to the electrical control 74 causes signals 88, generated from this stored information, to be applied to the beam deflector 80 in the correct sequence. This scan position information is also used by the electrical control in generating the scan signals 90.

Referring now to FIG. 7, there is illustrated in detaail a preferred embodiment of the various optical components comprising the optical scanning apparatus 72 shown in FIG. 6. The scanner 84 comprises a light-reflecting surface, such as a mirror M1, which is rotatable about first and second scanning axes 92 and 94, which are orthogonal with respect to each other. The beam deflector 80 comprises a pair of rotatable mirrors M2 and M3. Each mirror is rotatable about one of a pair of orthogonal axes 96 and 98. The imaging optics 82 includes first and second optical focusing elements L1 and L2 in the path of the deflected laser light beam 32. The focusing elements L1 and L2 are separated by a distance measured along the beam path equal to the sum of the focal lengths $f_1$ and $f_2$, respectively, of the focusing elements L1 and L2. Also, the first focusing element L1 is separated from the beam deflector 80 by a distance measured along the beam path equal to the focal length of $f_1$ of the first focusing element L1. The second focusing element L2 is separated from the faceplate by a distance measured along the beam path substantially equal to the focal length $f_2$ of the second focusing element L2. Both focusing elements L1 and L2 are illustrated here as converging lenses. Also, as illustrated in FIG. 7, $f_2$ is greater than $f_1$ to provide magnification of the cross-sectional area of the light beam. By proper selection of these lenses, the beam area at the mask may be made greater than the size of the apertures to simultaneously direct light through a plurality of apertures as in FIG. 3. or may be made equal to the apertures as in FIG. 5.

The optical scanning apparatus 72 may, although not necessarily, include additional structural features which may advantageously be utilized. For example, it may be desirable that the beam from the light source 76 be well collimated or that its diameter be modified before entering the remainder of the optical system. It may be desirable to insert a telecentric lens system, such as lenses L3 and L4, in the path of light beam 51 immediately as it leaves the laser light source 76. These lenses L3 and L4 are separated by substantially a distance equal to the sum of their focal lengths, $f_3$ and $f_4$, respectively; in the exemplary embodiment, the lenses are converging lenses. Diverging lens L5 may be inserted into the path of the light beam 51 at a location to the left of the beam deflector 80 for control of the beam area at scanner 34.

The embodiments of the present invention are intended to be merely exemplary and those skilled in the art shall be able to make numerous variations and modifications of them without departing from the spirit of the present invention. For example, while in the preferred embodiment, the heated film liquefies and withdraws from the designated areas, the invention also includes the idea of heating the film to an extent as to cause volatilization of the film material. All such variations and modifications are intended to be within the scope of the present invention as defined by the appended claims.

I claim:
1. In a method of manufacturing a color cathode ray tube in which an image screen is deposited on a glass faceplate and consists of a plurality of sets of elemental screen areas which areas individually include a phosphor material for emitting light of one of three primary colors and a light filter disposed between the phosphor material and the glass faceplate which is predominantly transmissive to light emitted by its associated phosphor material but substantially nontransmissive to the remaining two primary colors, and areas adjacent to the elemental screen areas which include more than one light filter, an improved method for forming the light filters which comprises:

(a) applying a first thin film of a metallic resinate to the faceplate, the first thin film having an inorganic oxide colorant of a first of the three primary colors in a vehicle of organic character which volatilizes upon firing to a predetermined temperature;

(b) directing a laser beam of light to the elemental screen areas of the image screen corresponding to the second and third primary colors, the absorption of the laser light by the first thin film or by the glass faceplate adjacent to the film creating localized liquefaction of the first film, the fluid, in response to being acted upon by forces of surface tension and rapidly volatilizing residual solvents in the first thin film, withdrawing from the elemental screen areas for the second and third primary colors;

(c) heating the first thin film by an amount which is effective to raise the energy threshold at which liquefaction occurs but ineffective to volatilize the organic material;

(d) applying a second thin film of a metallic resinate to the first thin film and to the faceplate adjacent to the holes, the second film having an inorganic oxide colorant of a second of the three primary colors in a vehicle of organic character which volatilizes upon firing to a predetermined temperature;

(e) directing a laser beam of light to the elemental screen areas of the image screen corresponding to the first and the third primary colors, the absorption of the laser light by the second thin film creating localized liquefaction of the second film without liquefying the first film due to its raised energy threshold, the fluid withdrawing from the elemental screen areas for the first and third primary colors in response to being acted upon by forces of surface tension and rapidly volatilizing residual solvents in the second thin film;

(f) heating the second thin film by an amount which is effective to raise the energy threshold at which liquefaction occurs but ineffective to volatilize the organic material;

(g) applying a third thin film of a metallic resinate to the second thin film and to the first thin film adjacent to the holes in the second thin film, the third thin film having an inorganic oxide colorant of the third of the three primary colors in a vehicle of organic character which volatilizes upon firing to a predetermined temperature:

(h) directing a laser beam of light to the elemental screen areas of the image screen corresponding to the first and second primary colors, the absorption of the laser light by the third thin film creating localized liquefaction of the third thin film without liquefying the second or first thin films due to their raised energy thresholds, the fluid withdrawing from the elemental screen areas for the first and second primary colors in response to being acted upon the forces of surface tension and rapidly volatilizing solvents in the third film: and (i) heating the entire first, second, and third thin films having holes formed therein to volatilize the organic material to form the light filters on the elemental screen areas for the primary colors and the adjacent areas, the light filter for each primary color being disposed on the elemental screen areas corresponding to that primary color and being absent from the elemental screen areas corresponding to the other two primary colors.

2. The improved method according to claim 1 wherein each step of directing a laser beam of light to the elemental screen areas corresponding to two primary colors includes:
   (a) scanning a laser beam in a fashion adapted to intercept the entire surface of the thin film, and
   (b) conditioning the scanned laser beam so that the beam intercepts only the elemental screen areas for the two primary colors.

3. The improved method according to claim 2 wherein the step of conditioning the scanned laser beam includes:
   (a) placing a shadow mask between the thin film and the effective source of the scanning laser beam, and
   (b) positioning the effective source of the beam at a location to effect the interception of the thin film only at the elemental screen areas for the two primary colors.

4. The improved method according to claim 2 wherein the step of conditioning the laser beam includes:
   (a) shaping the laser beam so as to have a cross-sectional shape and area at the interception of the thin film which are equal to that of the elemental screen areas for the two primary colors, and
   (b) modulating the laser beam such that the beam is on when intercepting the elemental screen areas for the two primary colors and off when intercepting the adjacent areas and the elemental screen areas for the preselected primary color.

5. The improved method according to claim 4 wherein the elemental screen areas are circular.

6. The improved method according to claim 4 wherein the elemental screen areas are slots.

7. The improved method according to claim 3 further including:
   focussing the scanning laser beam so that substantially all of the laser beam passes through the apertures in the shadow mask.

* * * * *